United States Patent [19]
Cavanagh

[11] 3,923,462
[45] Dec. 2, 1975

[54] PHOTOGRAPHIC DETECTION AND INTEGRATION OF LIGHT EMITTED FROM LUMINESCENT REACTIONS

[75] Inventor: Leonard Alan Cavanagh, San Jose, Calif.

[73] Assignee: Stanford Research Institute, Menlo Park, Calif.

[22] Filed: June 17, 1974

[21] Appl. No.: 480,043

[52] U.S. Cl. ......... 23/232 R; 23/230 B; 23/253 TP; 23/254 R
[51] Int. Cl.² .................. G01N 31/22; G01N 21/12
[58] Field of Search .......... 23/230 R, 230 B, 253 R, 23/232 R, 232 E, 254 R, 254 E, 255 R, 255 E

[56] References Cited
UNITED STATES PATENTS

| | | | |
|---|---|---|---|
| 2,741,544 | 4/1956 | Chaikin et al. | 23/255 |
| 3,482,944 | 12/1969 | Plantz et al. | 23/253 R |
| 3,520,660 | 7/1970 | Webb | 23/254 E |
| 3,528,779 | 9/1970 | Fontijn | 23/254 E |
| 3,712,793 | 1/1973 | Lyshkow | 23/232 E |
| 3,734,691 | 5/1973 | Kukla et al. | 23/253 R |

*Primary Examiner*—R. E. Serwin
*Attorney, Agent, or Firm*—Urban H. Faubion

[57] ABSTRACT

A low concentration of a substance, e.g., ozone, in a fluid, usually ambient air, is detected and indicated by passing a sample of the fluid through a light-tight enclosure in reacting proximity to a material, e.g., Rhodamine B, which luminesces in the presence of the substance to be detected or a material which normally luminesces (e.g., magnesium oxinate in 3650 Angstrom black light) and is quenched in the presence of the substance to be detected (e.g., hydrogen fluoride). Photographic film is positioned in the enclosure to be exposed to the luminescent reaction of the reactant material and the reacting substance to be detected, whereby exposure of the film indicates presence of a luminescent reaction (including a quenching of luminescence), hence, pressure of the substance to be detected, and film density is a measure of the summation or integral of the amount of the substance present (integral of the light emitted from the luminescent reaction over the time period of exposure).

15 Claims, 2 Drawing Figures

PHOTOGRAPHIC DETECTION AND INTEGRATION OF LIGHT EMITTED FROM LUMINESCENT REACTIONS

BACKGROUND OF INVENTION

It is important from the standpoint of health and also by reason of regulations regarding pollutants to be able to monitor the quality of a fluid, particularly air, and especially to be able to detect a wide range of concentrations of a pollutant species, and at the same time have the capability of assessing the amount of pollutant present over extended periods. The invention is particularly useful for monitoring ozone in air and therefore is described principally in this context. It is to be understood, however, that a broader usage is contemplated.

For the most part, methods for detecting very low concentrations of substances, e.g., a pollutant species, a few parts per billion (ppb) or greater, and systems for determining the total amount of the substance (pollutant) present over a given extended period of time are complex and costly.

Accordingly, it is an object of the present invention to provide a simple, inexpensive means for detecting a wide range of concentrations of a substance of interest (e.g., a pollutant species) and at the same time to provide a means for integrating or summing the total amount of substance present over a finite period of time.

Further, it is an object of the invention to provide such a detector and monitor which is lightweight and portable.

SUMMARY OF INVENTION

A simple system for detecting the presence of a given substance in a fluid and providing a means for indicating the amount of the substance present over a given time period is provided by placing a photographic film in exposed relationship to a material which undergoes a luminescent reaction (either stimulation or quenching) in the presence of a substance to be detected, providing a light-tight enclosure around both the film and the material, and providing means to introduce the fluid to be sampled in reacting relationship to the material so that a luminescent reaction takes place when the substance to be detected is present in the fluid sample. The photographic film is exposed by the luminescence and film density provides an indication of the intensity of illumination and the time during which the luminescent reaction has taken place, thus to provide an indication of the total amount of the substance to be detected which was present during the time of exposure (an integrating function). In one embodiment, means is also provided to advance the film a frame at a time to produce the indication of the total amount of the substance present while each frame is exposed. In another embodiment, means is provided to advance the film continuously, thereby to provide a running record of the amount of the substance present.

The novel features believed to be characteristic of the invention are set forth with particularity in the appended claims. The invention itself, however, both as to its organization and method of operation, together with further objects and advantages thereof, may best be understood by reference to the following description taken in connection with the accompanying drawing.

DESCRIPTION OF PREFERRED EMBODIMENT

Figure 2:
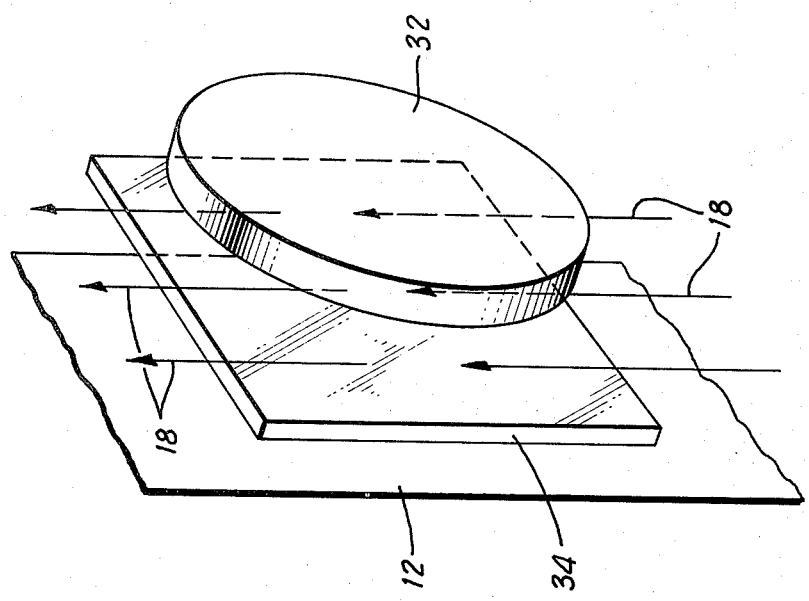
FIG. 2 is an exploded view illustrating the principal elements of the dosimeter illustrated in FIG. 1.

The preferred embodiment of a dosimeter 10 which is used to describe the general principles employed is illustrated in the two figures of the drawing. The particular dosimeter 10 illustrated is especially useful for sampling the air and is described in that context. It will be understood, however, that other fluids may be sampled. Therefore, reference to the atmosphere or air is intended as an example rather than a limitation.

The measurement of the dosage of a substance to be detected is based upon the ability of a photographic film 12 to detect and integrate light from a luminescent reaction. The term "luminescent reaction" as used herein includes a reaction whereby luminescence is stimulated and also a reaction where luminescence is quenched. The system 10 illustrated, as is explained later, relies upon a luminescent reaction wherein luminescence is stimulated.

In the dosimeter 10 illustrated, the film 12 is contained in a cartridge 14 which is positioned in a light-tight enclosure 16 along with other elements of the dosimeter 10. Note that all elements of the dosimeter 10 are contained in the enclosure 16, making the unit totally self-contained and portable.

Figure 1:
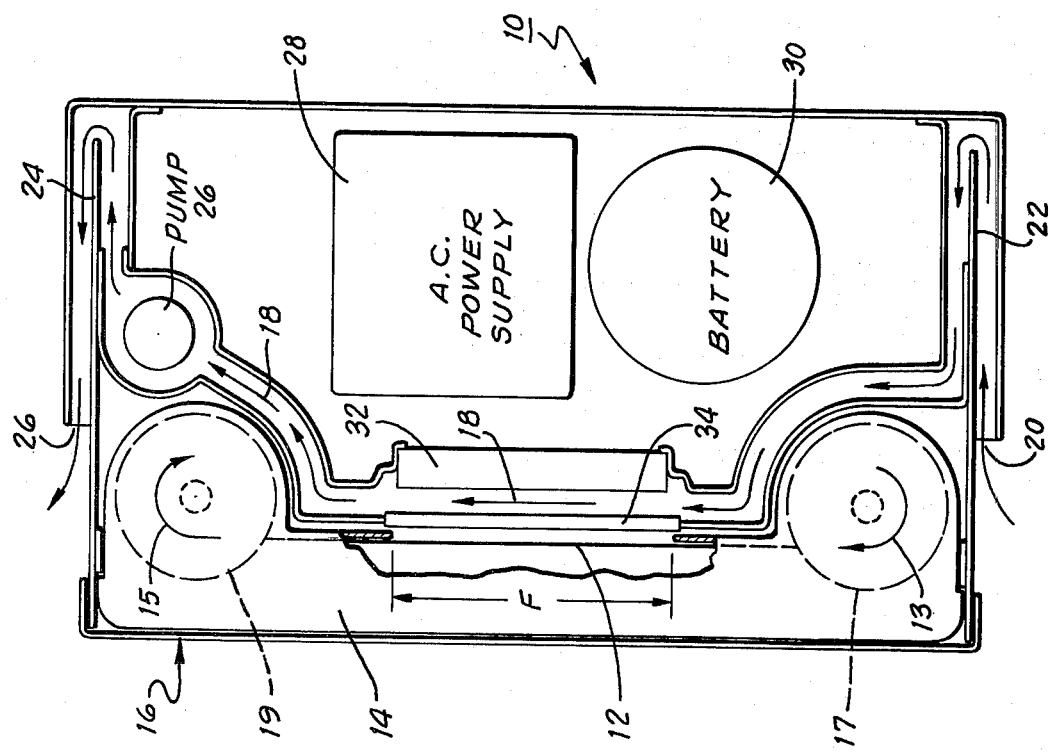
FIG. 1 is a vertical, longitudinal section through a dosimeter constructed in accordance with the principles of the invention.

In order to provide a means for continuously sampling the atmosphere, a narrow sample or air passage 18 is provided through the light-tight enclosure, as defined by a sample inlet 20 at the bottom of the enclosure and extending to the sample outlet 26 at the top of the enclosure. The air passage 18 is made somewhat tortuous (see FIG. 1) so that the enclosure retains its light-tight character while still providing free flow for the sample through the enclosure 16. That is, the air passage 18 may be traced from the air inlet 20 at the bottom of the enclosure in the drawing, to the right where it doubles back on itself around a lip 22, up through the body of the enclosure to the top of the unit, and again to the right where it again folds back on itself around another lip 24 to the air outlet 26. The two "folds" in the path around the lips 22 and 24 present essentially no restriction to gas flow but do prevent light from entering the main body of the enclosure 16. In order to prevent decomposition or loss of reactant during sample flow, the surfaces of the sample passage 18 may be coated (not shown) with an inert material such as the fluorocarbon commercially available under the trade name Teflon.

The air or gas sample is moved through the light-tight enclosure 16 by a small pump 26 located in the air passage 18. The pump 26 is driven by a battery 30 housed in the enclosure 16. The pump drive and circuitry are entirely conventional and therefore not illustrated in detail; however, the self-contained battery charging alternating current power supply 28 used with the particular instrument is shown schematically in the enclosure 16.

In order to assure the luminescent reaction in the presence of a dosage of the substance to be detected in the sample, a disk 32 of a material which luminesces in the presence of the substance to be detected is positioned to form a portion of one wall of the air passage 18. Thus, all of the sample passing through the dosimeter 10 is drawn over the surface of the luminescent disk 32. The film cartridge 14, it will be noted, is positioned so that a frame, F, of the film 12 is spaced directly across the air passage 16 from the surface of the luminescent disk 32.

In other embodiments the arrangement of film 12 and material which luminesces in the presence of the substance may be different. For example, the disk 32 may take any convenient configuration and, in fact, may be made porous and the sample passed therethrough, or for that matter, the luminescing material may be placed on the film as by mixing it in the emulsion. The important point is that the material be subjected to the sample and that the film 12 be positioned to be exposed by the resultant light.

A pollutant concentration range capability greater than the normal density latitude of the film 12 alone is provided by positioning a standard optical step wedge 34 adjacent the surface of the film 12 and spaced across the air passage from the luminescent material 32. The optical step wedge also serves to isolate the film 12 from the reactant gas. If the optical step wedge is not desired for a particular application, the film 12 can also be isolated from the reactant gas by means of clear glass plate (not shown). The exploded view of FIG. 2 shows the orientation of the film 12, the optical step wedge 34, the luminescent disk 32 and the reactant gas flow. A means is provided for advancing the film 12 in the film cartridge 14 so that a number of frames of the film can be exposed before processing. If it is desired to have a continuous record of pollutant concentration, the film may also be driven at a constant rate rather than on a frame-by-frame basis. The film advancing system is not shown in great detail since it is entirely conventional, but it is indicated by arrows 13 and 15 on film spools 17 and 19, respectively.

The particular dosimeter 10 illustrated is used to detect the presence of ozone in air and, therefore, the luminescent reaction recorded by the photographic film is a chemiluminescent reaction, which in the preferred embodiment takes place between ozone and the organic dye commonly referred to as Rhodamine B. Other examples of reaction which the device disclosed can be utilized for are ozone and ethylene and ozone with nitric oxide. Such chemiluminescent reactions are reported in V. H. Regener, "Measurement of Atmospheric Ozone with the Chemiluminescent Method" (J. Geophys. Research, v. 69, n. 18, Sept. 15, 1964, pp. 3795–3800), and J. A. Hodgeson et al., "Chemiluminescent Measurement of Atmospheric Ozone: Response Characteristics and Operating Variables" (Analytical Chem., v. 42, n. 14, Dec. 1970, pp. 1795–1802). The subject matter of these articles is specifically incorporated by reference for background and illustration of the state of the art. Note particularly that the technique allows instrumentation for atmospheric monitors of nitric oxide as well as other oxides of nitrogen and ammonia utilizing appropriate reactions to convert these compounds to nitric oxide.

The technique successfully provides a film density proportional to the reactant concentration over periods from less than one minute to more than 24 hours at ambient atmospheric concentration. Films that have been successfully used are Polaroid Type 57 and Type 410. For very low light levels over extended intervals, Eastman Kodak Type 103aF astronomical film is suitable.

Readout of the film density can be accomplished by manual comparison with a standard optical step wedge or, to a greater precision, with a densitometer.

The luminescent reactions discussed above (e.g., ozone/Rhodamine B) are ones wherein luminescence is stimulated and the amount of reactant (ozone) determines the intensity of light given off by the reaction. Therefore, the reaction causes an increase in the density of the processed film and denser film indicates more pollutant present. However, as previously indicated, quenching of luminescence is also included within the term "luminescent reaction" as described here. It is contemplated that the instrument incorporate a material which normally luminesces and which is quenched by the presence of a pollutant. For example, if hydrogen fluoride is a substance to be detected, magnesium oxinate may be used as the luminescent material. The magnesium oxinate normally luminesces when subjected to a 3650 Angstrom black light and the luminescence is quenched in the presence of hydrogen fluoride. Thus, a photographic film subjected to a light emitted from the luminescing magnesium oxinate becomes denser with time of exposure. A means, such as a filter, should be provided to avoid exposure of the film to the 3650 Angstrom black light. When hydrogen fluoride is present, causing a reduction in the light emitted from the luminescing magnesium oxinate, the film will be less dense for a given time of exposure by a measurable amount, thus giving a measurement of the amount of hydrogen fluoride present.

Thus, it is seen that a simple and inexpensive method and apparatus to detect and integrate light emitted from luminescent reactions are provided.

It is also seen that the instrument provided is much simpler and cheaper than atmospheric monitors of ozone and nitric oxide or other oxides of nitrogen and ammonia, which generally require sensitive electrical photodetectors to detect the luminescent reactions.

Further, it is seen that the integration technique makes it feasible to provide personal dosimeters which will determine an individual's total exposure to pollutants over selected intervals of time.

While a particular embodiment of the invention is shown, it will, of course, be understood that the invention is not limited thereto since many modifications to the instrumentalities may be employed without departure from the invention. It is contemplated that the appended claims will cover any modifications which fall within the true spirit and scope of the invention.

What is claimed is:

1. A system for detecting the presence of a given substance in a fluid and providing a means of indicating the amount of the given substance present over a given time period, including:

a light-tight enclosure;

a material positioned within said enclosure, which material undergoes a luminescent reaction in the presence of the said substance to be detected;

photographic film positioned in said enclosure in exposed relation to the said material, whereby the said film is exposed to luminescent emissions; and means for moving the said fluid through the said enclosure in intimate contact with said material, whereby said material undergoes a luminescent reaction with said substance and the said photographic film is exposed to the said luminescent emissions.

2. A system as defined in claim 1, wherein an optical step wedge is positioned between said material and said film.

3. A system as defined in claim 1, wherein said material is one which luminesces in the presence of the said substance to be detected.

4. A system as defined in claim 2, wherein said material is one which luminesces in the presence of the said substance to be detected.

5. A system as defined in claim 1, wherein the given substance is ozone and the said material is chemiluminescent in the presence of ozone.

6. A system as defined in claim 5, wherein the chemiluminescent material is Rhodamine B.

7. A system as defined in claim 1, wherein said photographic film is contained in a cassette with one frame exposed to said material and means is provided to advance the film from frame to frame, thereby sequentially to expose single subsequent frames.

8. A system as defined in claim 5, wherein said photographic film is contained in a cassette with one frame exposed to said chemiluminescent material and means is provided to advance the film from frame to frame, thereby sequentially to expose single subsequent frames.

9. A system as defined in claim 6, wherein said photographic film is contained in a cassette with one frame exposed to said luminescent material and means is provided to advance the film from frame to frame, thereby sequentially to expose single subsequent frames.

10. The method of detecting a light-producing reaction, comprising:
    positioning a material which produces light in the reaction to be detected in a light-tight enclosure;
    positioning a photographic film in the said light-tight enclosure adjacent said material, whereby said film is exposed by light from the said reaction of said material; and
    developing said photographic film thereby to provide an observable indication of its state of exposure and, hence, an indication of the presence of the said reaction.

11. The method defined in claim 10, wherein the light-producing reaction to be detected is chemiluminescence and said material which produces light in the reaction is chemiluminescent.

12. The method of detecting the presence of a given substance in a fluid and producing an indication of the amount of the given substance present over a given time period, comprising:
    positioning a material which produces light in the presence of the said substance to be detected in a light-tight enclosure;
    positioning a photographic film in the said enclosure in spaced-apart but exposed relation with respect to said material, whereby said film is exposed by light produced by interaction of said substance and material; and
    developing said photographic film thereby to provide an observable indication of its state of exposure and, hence, an indication of the amount of the said substance present over the time interval of exposure of said film to the said material.

13. A system as defined in claim 1, wherein said photographic film is contained in a cassette with one frame exposed to said material and means is provided to advance the film in a continuous manner past said luminescent reaction, thereby to provide a continuous monitor of said reaction.

14. A system as defined in claim 5, wherein said photographic film is contained in a cassette with one frame exposed to said chemiluminescent material and means is provided to advance the film in a continuous manner past said luminescent reaction, thereby to provide a continuous monitor of said reaction.

15. A system as defined in claim 6, wherein said photographic film is contained in a cassette with one frame exposed to said luminescent material and means is provided to advance the film in a continuous manner past said luminescent reaction, thereby to provide a continuous monitor of said reaction.

* * * * *